(No Model.)

W. P. RYLANDER.
BALE TIE.

No. 355,887. Patented Jan. 11, 1887.

WITNESSES:

INVENTOR:
W. P. Rylander
BY Munn & Co.
ATTORNEYS.

UNITED STATES PATENT OFFICE.

WILLIAM P. RYLANDER, OF LOCKHART, TEXAS.

BALE-TIE.

SPECIFICATION forming part of Letters Patent No. 355,887, dated January 11, 1887.

Application filed September 17, 1886. Serial No. 213,816. (No model.)

*To all whom it may concern:*

Be it known that I, WILLIAM P. RYLANDER, of Lockhart, in the county of Caldwell and State of Texas, have invented a new and Improved Bale-Tie, of which the following is a full, clear, and exact description.

My invention consists, principally, of a bale-tie jaw stamped from sheet metal and formed with an open hook at one end standing in front of a curved edge, with an opening at the other for attachment to the bale-hoop, said opening being shaped to permit the jaw to have a pivotal side motion upon the hoop.

The invention also consists of the combination of two of such jaws applied to the bale-hoop to form a complete tie.

Reference is to be had to the accompanying drawings, forming a part of this specification, in which similar letters of reference indicate corresponding parts in all the figures.

Figure 1:
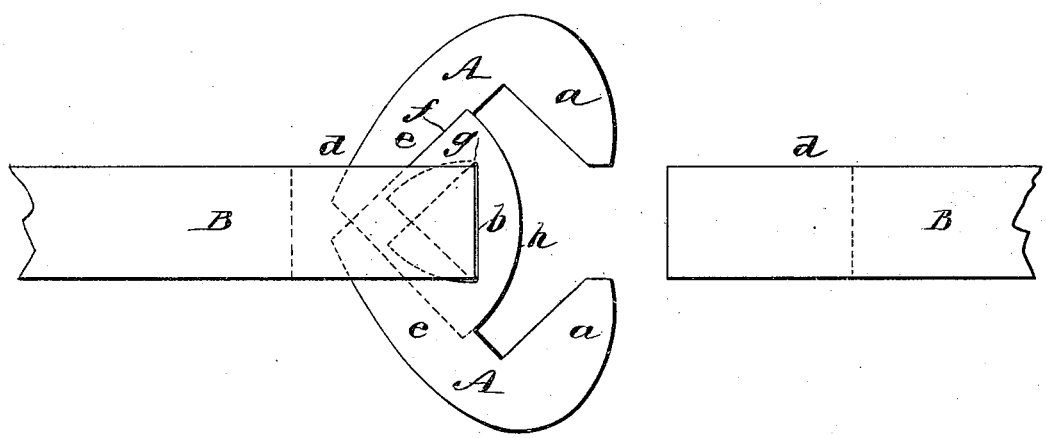
Figure 2:
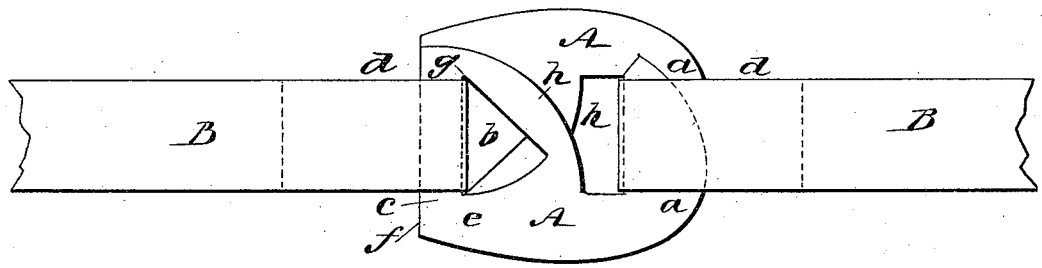
Figure 4:
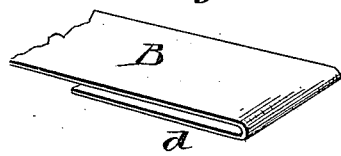
Figure 3:
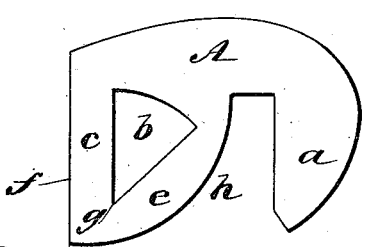
Figure 5:
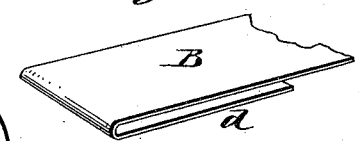

Figure 1 illustrates my new bale-tie applied to one end of the bale or hoop and open to receive the opposite end of the hoop. Fig. 2 illustrates the hooks connected to both ends of the hoop. Fig. 3 is a plan view of one of the jaws, and Figs. 4 and 5 are perspective views of the ends of the hoops folded to receive the hooks.

A A represent the two jaws of the tie, and B B represent the bale-hoop, folded back upon itself at each end to form the loops $d\ d$. The jaws A are stamped from sheet metal, and are each formed with a hook, $a$, and opening $b$ in line with the hook, which opening forms the bar $c$. The opening $b$ in each jaw is made triangular in form in the plate portion $e$ of the jaw, one edge of the opening being parallel with the rear edge, $f$, of the jaw. The two jaws are placed in one of the loops $d$ of the bale-hoop, so that the hooks $a$ point in opposite directions. The openings $b$ permit the jaws A A to be opened, as shown in Fig. 1, to receive the loop $d$ at the opposite end of the hoop, and closed in said loop, as shown in Fig. 2, the pivotal points of the jaws being at the edges of the hoop at the angles $g$ of the openings $b$ of the jaws. The edges $h$ of the jaws adjacent to the hooks $a$ are curved to form space for the entrance of the loop $d$ between the jaws.

In use the jaws are simply to be opened and the loops placed between the jaws, and then the jaws have simply to be closed in the loop, as shown in Fig. 2.

By constructing the tie as described the same is not only cheap, but very strong and easily operated, and may be used over and over again.

Having thus fully described my invention, what I claim as new, and desire to secure by Letters Patent, is—

1. As a new article of manufacture, a bale-tie jaw formed with a hook, $a$, bar $c$, and curved edge $h$ back of the hook, and formed with an opening, $b$, in front of the bar, to permit a pivotal action of the hook at the edge of the bale-hoop, substantially as described.

2. The bale-hoop B, formed with loops $d$, in combination with the two jaws A A, formed with hooks $a$, bars $c$, and triangular openings $b$, substantially as described.

WILLIAM P. RYLANDER.

Witnesses:
H. A. WEST,
C. SEDGWICK.